(12) United States Patent
Robideau

(10) Patent No.: US 9,499,222 B2
(45) Date of Patent: Nov. 22, 2016

(54) DEVICE FOR ESTABLISHING A LINE ON A VEHICLE'S BODY PANEL

(71) Applicant: Terry David Robideau, Gresham, OR (US)

(72) Inventor: Terry David Robideau, Gresham, OR (US)

( * ) Notice: Subject to any disclaimer, the term of this patent is extended or adjusted under 35 U.S.C. 154(b) by 99 days.

(21) Appl. No.: 14/688,176

(22) Filed: Apr. 16, 2015

(65) Prior Publication Data

US 2016/0304143 A1    Oct. 20, 2016

(51) Int. Cl.
*G01B 5/25* (2006.01)
*B62D 65/00* (2006.01)
*B21D 1/12* (2006.01)

(52) U.S. Cl.
CPC ............... *B62D 65/005* (2013.01); *B21D 1/12* (2013.01); *G01B 5/25* (2013.01)

(58) Field of Classification Search
CPC ............. G01B 5/14; G01B 5/00; G01B 3/20
USPC .......................................... 33/288, 600, 533
See application file for complete search history.

(56) References Cited

U.S. PATENT DOCUMENTS

| | | | | |
|---|---|---|---|---|
| 2,799,190 A * | 7/1957 | Awot | ...................... | B21D 1/06 254/131 |
| 3,596,962 A * | 8/1971 | Hertzell | .................. | B60R 13/04 293/128 |
| 3,724,083 A * | 4/1973 | Mehl | ...................... | B43L 13/22 235/70 R |
| 4,291,467 A * | 9/1981 | Shultz, Jr. | ............... | B43L 13/22 33/561.2 |
| 4,538,354 A * | 9/1985 | Smolik | .................... | B23B 47/28 33/563 |
| 4,828,303 A * | 5/1989 | Soria | ....................... | B60R 13/04 248/206.3 |
| 4,958,439 A * | 9/1990 | Dehn | ................... | G01B 5/0025 33/339 |
| 5,050,308 A * | 9/1991 | Walsh | .................... | B24D 15/00 33/32.2 |
| 5,140,784 A * | 8/1992 | Walsh | .................... | B24D 15/00 451/495 |
| 5,162,139 A * | 11/1992 | Gomez | ................... | B60R 13/04 248/206.3 |
| 6,389,703 B1 * | 5/2002 | Ferenczi | .................. | B21D 1/12 33/288 |
| 6,827,363 B1 * | 12/2004 | Amerson | .................. | B60D 1/36 280/477 |
| 7,874,080 B1 * | 1/2011 | Morales | ............... | G01B 5/0025 33/600 |
| 2009/0140533 A1 * | 6/2009 | Keough | ................... | B60R 19/42 293/109 |

* cited by examiner

*Primary Examiner* — Yaritza Guadalupe-McCall
(74) *Attorney, Agent, or Firm* — Mark S Hubert

(57) ABSTRACT

A precision device for establishing a contour line of body filler on an automobile panel that allows a body repairman to create two (or more) control surfaces in which to work between. The body repairman no longer has to eyeball his/her contour work; for example, by walking to the front of the automobile to see how the contour of the panel being restored "matches" the non-damaged panels when viewed from the front of the automobile. The body repairman can now create a region to work between two body filler lines (a manageable region of repair) established with a flexible rod, a set of pressure adjustable supports and some body filler. Working between these two body filler lines using a flexible contouring tool he may sweep body filler between the upper and lower lines to identically approximate the long sweeping contour lines of the original vehicle.

7 Claims, 6 Drawing Sheets

DEVICE FOR ESTABLISHING A LINE ON A VEHICLE'S BODY PANEL

The present invention relates generally to auto body tools. More particularly, the present invention relates to a tool for establishing a precise raised reference line on a vehicle's body panel.

BACKGROUND OF THE INVENTION

Whether constructed from heavy gauge metals with flat or nearly flat profiles, or from lightweight metals with numerous contours, repairing a damaged panel is a laborious and iterative process in which a synthetic body filler is applied in excess to the auto body panel and then the excess material is cut away using a removal tool. Much of the quality of the work lies in the skill of the craftsman's eyes and hands.

Modern automobile panels often have contoured bodylines that extend over several panels appearing contiguous over the length of the automobile. When a panel is damaged, these thin, irregularly shaped panels, are extremely hard to fill accurately, often resulting in a "fix" that simply does not match the original contour. What was a painstaking process in the past, when panels where flat, is presently even more labor intensive, and typically reserved for auto body repair professionals. Additionally, the flow of a bodyline can easily be visually interrupted by miniscule low and high spots along its length as the human eye can detect variations in height down to $1/10,000$ of an inch. This is especially true with the more complex bodylines of today's sports cars.

When trying to customize vehicles, the bodylines are often altered because, after all that is generally how vehicles are identified and distinguished. The problem is that the vehicle's bodylines extend the length of the vehicle and to flawlessly change these long sweeping lines so that the human eye cannot detect surface contour deviations is difficult. Not all body repairmen have the exacting skill level required to freehand the reconstruction of a lengthy body line. Henceforth, a device and method of use that allows the body repairman to work from a single or multiple perfect reference lines that outline the sweep of the body panel would fulfill a long felt need in the vehicular body panel repair industry. This new invention utilizes and combines known and new technologies in a unique and novel configuration to overcome the aforementioned problems and accomplish this.

SUMMARY OF THE INVENTION

In accordance with the invention, an automobile panel bodyline (contour) whether original or newly customized, can quickly be established with a precision device for establishing a panel bodyline. The present invention can be used facilitate the matching factory contours or create a new bodyline, creating a truly one-of-kind restoration. It has many of the advantages mentioned heretofore and many novel features that result in a new automotive body work device which is not anticipated, rendered obvious, suggested, or even implied by any of the prior art, either alone or in any combination thereof The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. There are, of course, additional features of the invention that will be described hereinafter and which will form the subject matter of the claims appended hereto.

DETAILED DESCRIPTION

The precision device for establishing a line on a vehicle panel 10 (the device) allows a body repairman to replicate, on the vehicle's panel, a reference line having the height and contour of the original body line in the horizontal plane, the vertical plane or a combination thereof. It may be used by itself or in conjunction with others the same length or of different lengths, depending on the extent of the damage or the size of the custom body panel. At least one thin, smooth reference line is formed between the rear face of the device and the front, outer face of the damaged body panel generally, with the same body filler used in the remainder of the repair. Around the appropriate sides of this reference line, additional body filler is applied to the body panel. On the side surface of this reference line (facing away from the body panel) the body repairman has at least one surface along which he can glide an end edge of a precision contouring tool (like the subject of U.S. Pat. No. 8,321,991) to shape the body filler between the reference line and another reference line or between the reference line and the body panel surface. The remaining shape of the body filler should be a perfectly contoured match for the original body panel. Generally, the body filler will be applied, let harden, and then be sanded until enough successive coats have been applied to build up to the perfect repair. However, depending on the depth of the repair work with the precision device for establishing a line on a vehicle panel, all of the body filler for the repair may be applied at once rather than in successive coats as is the current norm.

Figure 1:
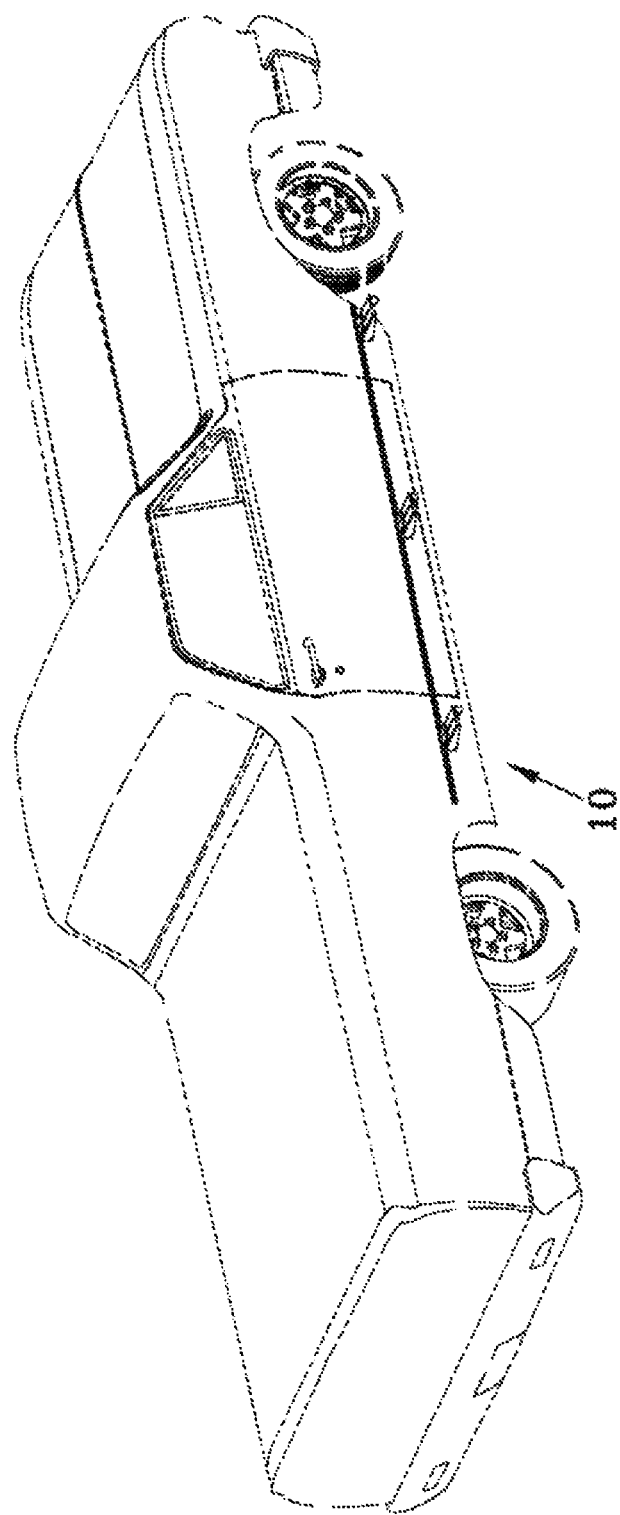
FIG. 1 is a perspective view illustrating a single precision device of the present invention in use.
Figure 2:
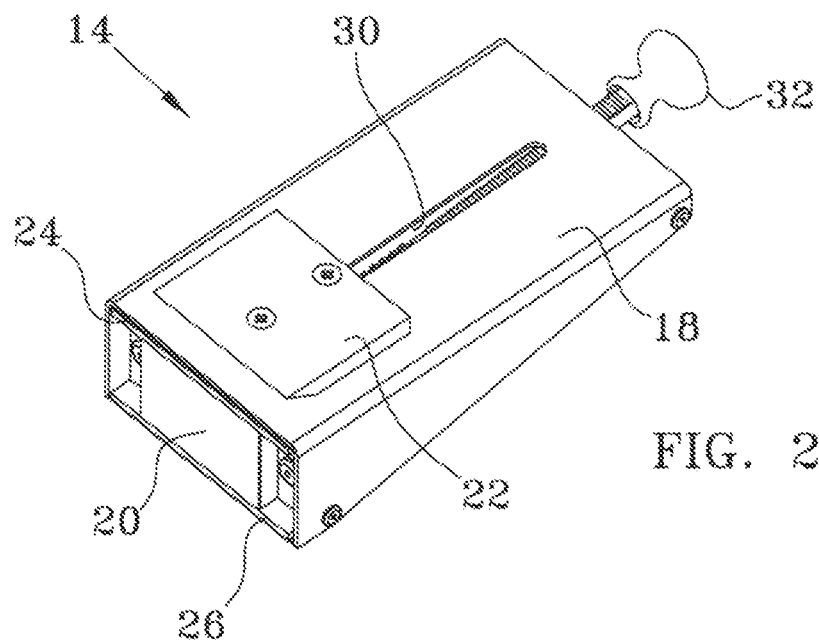
FIG. 2 is a perspective view of the locking member of the present invention.
Figure 3:
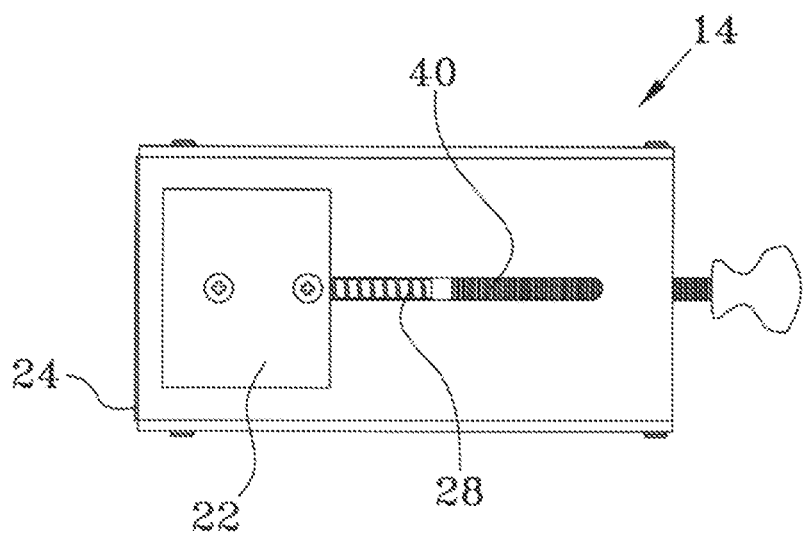
FIG. 3 is a top view of locking member of the present invention.
Figure 4:
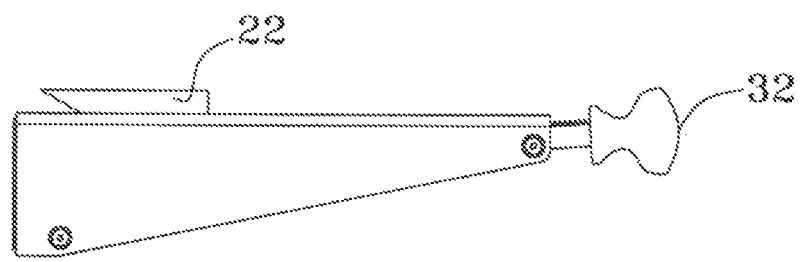
FIG. 4 is a left-side view of the locking member of the present invention.
Figure 5:
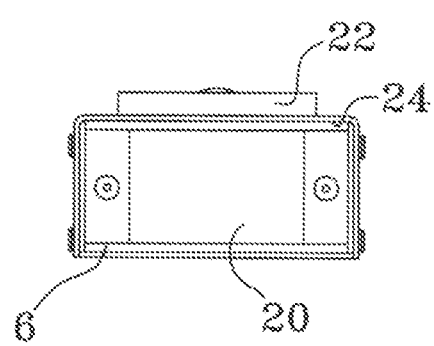
FIG. 5 is a front view of the locking member of the present invention.
Figure 6:
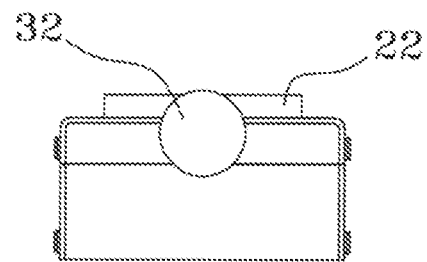
FIG. 6 is a back view of the locking member of the present invention.
Figure 7:
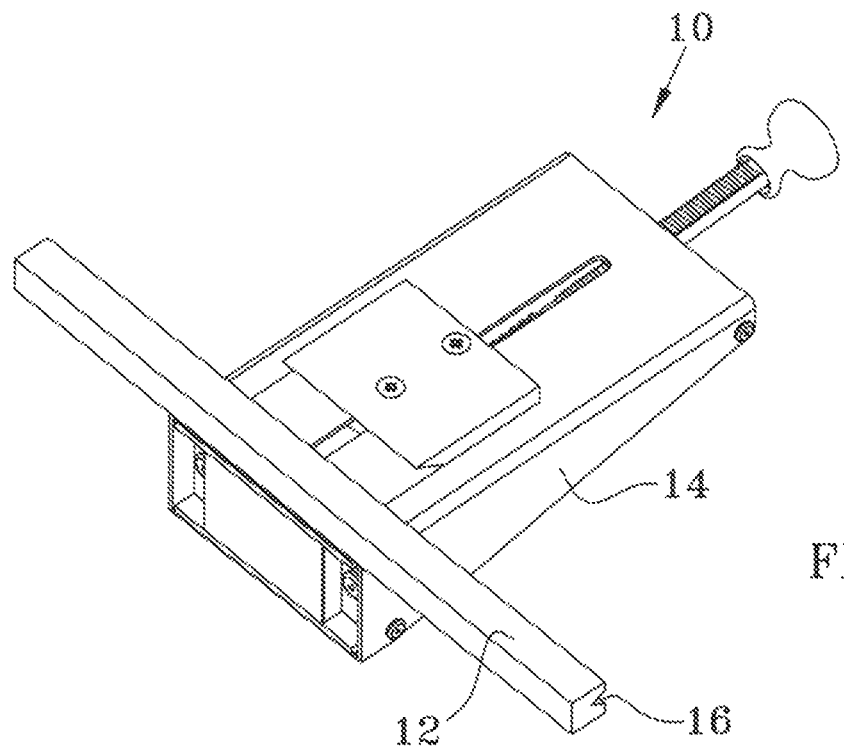
FIG. 7 is a perspective view of locking member and the flexible rod of the present invention.
Figure 8:
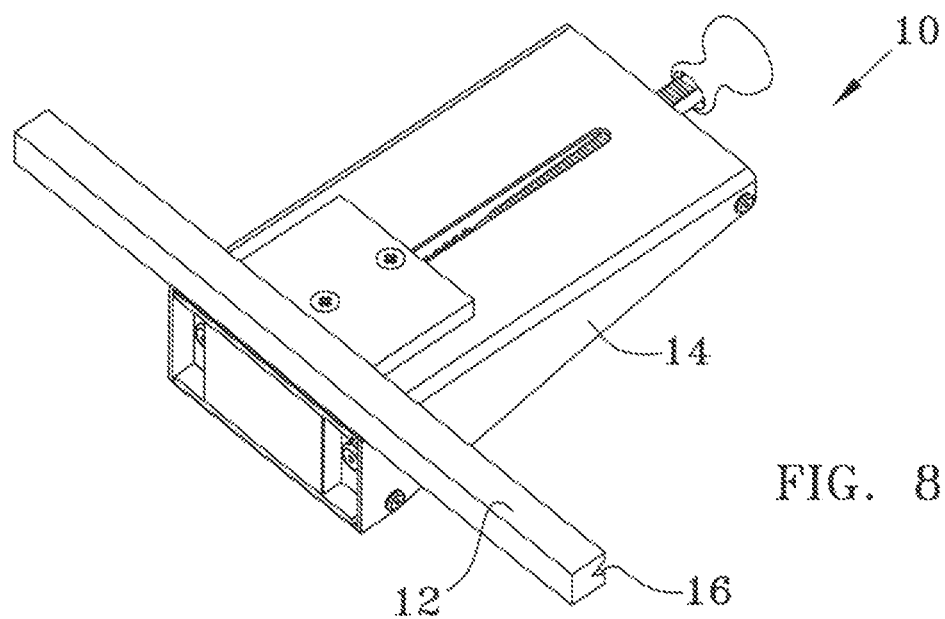
FIG. 8 is a perspective view of locking member engaged with the flexible rod of the present invention.
Figure 9:
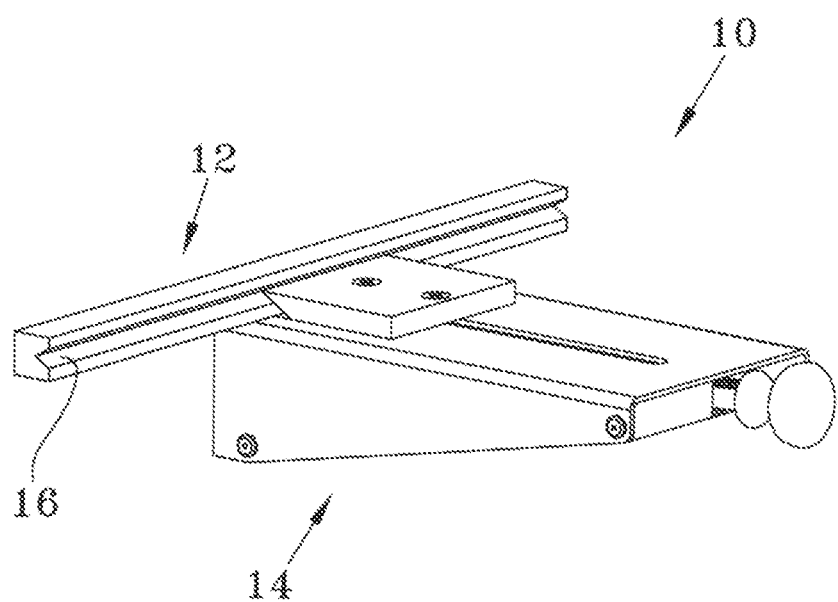
FIG. 9 is a second perspective view of locking member engaged with the flexible rod of the present invention.
Figure 10:
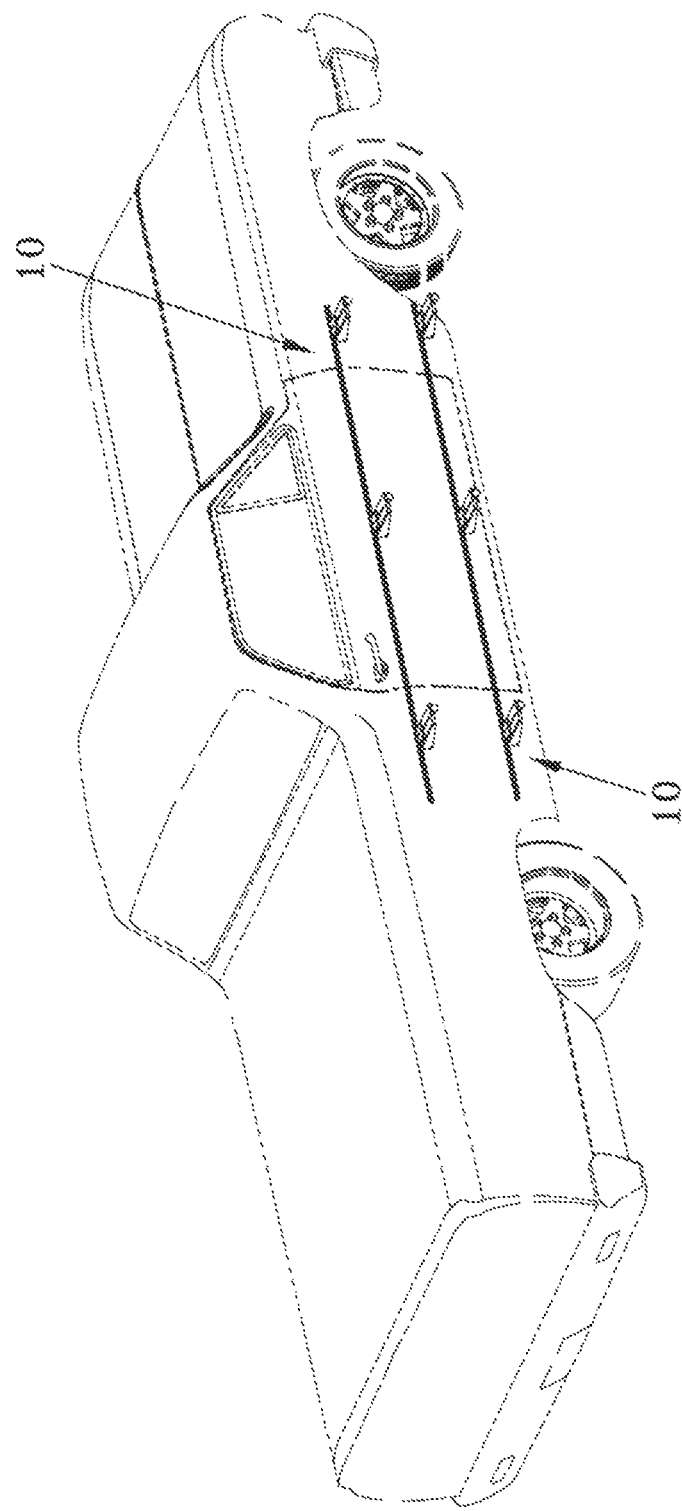
FIG. 10 is a perspective view illustrating two of the precision devices of the present invention in use.

Looking at FIG. 1 the device 10 for establishing a line on an automobile panel is illustrated "in use," meaning secured to an automobile panel undergoing restoration. FIG. 10 shows a situation where two of the devices are used. Precision device 10 includes flexible rod 12 and adjustable locking support 14. The rod has four planar surfaces with one of them centrally grooved as illustrated in FIGS. 7-9. Flexible rod 12 is generally square in cross-section with a V-shaped groove 16 formed length-wise along the longitudinal centerline of one side (the front side) of the rod 12. A flat back face is needed on the rod to contact the vehicle panel and be able to establish the start and end point as well as to help establish the contour. The square configuration allows the back surface to be maintained parallel to the body panel while a contour is established. This V shaped groove need not be configured, as a V as there is many other shapes that would also work provided that the lock plate 22 of the locking support 24 was matingly conformed. The V-shape has proven easy to clean and maintain free of body filler debris. The back side of the flexible rod 12 is planar and extremely smooth with the preferred embodiment having a coefficient of friction value of 0.05-0.08 at a 500 psi static load.

In the preferred embodiment the rod 12 is made of pultruded glass covered in Teflon® polytetrafluoroethylene (PTFE), although in an alternate embodiment the rod 12 may be made of a 25% glass filled Teflon® polytetrafluoroethylene (PTFE). This material was chosen as it provides an excellent weight to strength ratio, maintains the proper linear rigidity (which minimizes the number of locking supports needed to hold the rod to the desired contour), resists longitudinal twisting, is extremely flexible and able to withstand multiple bendings without experiencing inelastic fatigue, stretch or cracking, and most important has "slipperiness" (to prevent the cured, hardened body filler from sticking to the rod.) Additionally, it offers high chemical resistance, low and high temperature capability, resistance to weathering, low friction, electrical and thermal insulation. Being made polytetrafluoroethylene allows rod 12 to not scratch the paint of undamaged panels it may contact. Additionally, although not illustrated rod 12 can be made in various lengths and could be connected to another rod 12 to increase the overall length. In alternate embodiment, if a different polymer or metal is used for the rod's construction, a slick tape like PTFE may be applied to the surface.

Turning to FIGS. 2-6, locking support 14 allows rod 12 to be secured to a panel and comprises a housing 18, a magnet 20, and an adjustable locking plate 22. As illustrated, housing 18 has a rectangular magnet 20 affixed at its front-end. A first polymer or rubber seal 24 resides above and adjacent to magnet 20 on the top peripheral front edge of the locking support 14 and a second polymer or rubber seal 26 resides below and adjacent magnet 20 on the bottom peripheral front edge of the locking support 14. A single contiguous seal could also be utilized in place of the two separate seals. First and second seals 24 and 26 are flexible and elastically deformable (soft) allow locking support 14 to magnetically attach (via magnet 20) and detach to a panel without scratching or otherwise damaging the panel. The locking support 14 extends normally from the outer planar surface of the body panel (assumed as being horizontal herein). In the removal of the locking support 14, it is tipped away so as to break contact between its upper or lower peripheral edge and the body to reduce the magnetic attraction between the locking support 14 and the body panel. This can sometimes result in the other edge remaining on the body panel sliding on the panel. Here one of the rubber seals 24 or 26 protects the surface finish of the body panel. Similarly, as the locking support 14 approaches the surface of the body panel, the magnetic force overcomes the holding force of the body repairman and the locking support 14 quickly accelerates to the body panel with enough force to mar the body panel if the rubber seals were not there.

On the locking support, adjustable locking plate 22 slidingly resides on the top face of the housing 18. The locking plate 22 is trapezoidal in cross-section such that its front lip 34 is a knife-edge, and designed such that the front lip 34 can matingly engage the bottom half of the V-shaped groove 16. Locking plate 22 is mechanically affixed to a spring-loaded block (not illustrated) that can move along positioning rod 28, within the housing 18 by two mechanical fasteners extending normally between the locking plate 22 and the block through a slotted housing channel 30. (The positioning rod 28 has a linear axis parallel to the linear axis of the locking support 14.) When installed, the positioning rod 28 has the mechanical freedom to move vertically (so its grooves 40 can be lockingly engaged as discussed below) and horizontally so its depth within the housing can be positioned. This allows locking plate 22 to move along the linear axis of the locking support 14, can be centered about the housing channel 30. When extended to its fullest position, the distance between the front lip 34 and the face of the magnet 20 is less than the distance between the center of the V-shaped groove 16 on the front face of the rod 12, and the back face of the rod 12.

Since locking plate 22 is secured to the spring-loaded block on positioning rod 28, this allows the force applied to V-shaped groove 16 when contacted via lip 34 of locking plate 22 to be adjusted to obtain the desired bend in rod 12. Knob 32 is used to adjust the locking position of the positioning rod 28 by vertical manipulation. The positioning rod 28 has a series of grooves 40 (or a continuous thread) along part of its length. These grooves 40 on the bottom of the rod 28 matingly engage a rack or a lip on the housing 18 (not illustrated) that prevents movement and locks the positioning rod 28 in place. The force with which the front lip 34 of locking plate 22 presses on the V-shaped groove 16 in the flexible rod 12 is dictated by the amount of pressure exerted by the compression of the spring on the spring loaded block 40. This in turn is determined by the depth of insertion of the positioning rod 28 into the housing 18.

The top face and side faces of housing 18 as well as the exposed face of the 20 have low friction/non stick coatings or surfaces. In the preferred embodiment Teflon® or PTFE tape to which the synthetic body filler will not easily adhere.

In use, the body repairman eyeballs the damaged area and determines where the best "line of fit" for a reference contour line would be. This may be horizontal, vertical or have both horizontal and vertical components. This will involve selection of the proper length and number of flexible rods 12. Then once the location of the reference contour line is known he magnetically affixes at least two locking supports 14 to the body panel. These locking supports 14 may be located vertically above or below the flexible rod 12, depending on the situation. The flexible rod 12 is positioned such that the centerline of its V shaped groove 16 aligns with the front lip 34 of the locking plate 22 and the positioning rod 28 is manipulated to push the locking plate with sufficient force against the flexible rod 12 to hold the rod 12 against the body panel. The body repairman then determines the bend or contour of the flexible rod 12 in relation to the body panel and adds more locking supports 14 and adjusts the depth of the various positioning rods 28 to achieve that contour. This may be done by eye or by precise depth measurements at precise vertical and horizontal locations along the body panel. Then body filler is applied to the region between the body panel and the back face of the flexible rod 12 so as to form a body contour line. In the event there is a large gap between part of the body panel and the back of the flexible rod 12, adhesive tape may be used to seal this gap and prevent excess body filler from seeping out until it cures. When the body filer cures, the device is removed and the control surface or surfaces remain. Now body filler can be applied to the appropriate region adjacent to the contour line. Lying one end of an appropriate tool (such as the precision contouring tool, the subject of U.S. Pat. No. 8,321,991) on the control surface and the other end on another control surface or body panel, the tool can be used to remove, spread and generally contour the body filler into the precise configuration needed.

Precision device 10 for establishing a line on an automobile panel allows a body repairman to create two (or more) control surfaces in which to work between. The body repairman no longer has to eyeball his/her contour work; for example, by walking to the front of the automobile to see how the contour of the panel being restored "matches" the non-damaged panels when viewed from the front of the automobile. The body repairman can now create a region to work between two body filler lines established with precision device 10 as illustrated in FIG. 10, to create a manageable region of repair. Then working between these two body filler lines using a flexible contouring tool he may sweep body filler between the upper and lower lines to identically approximate the long sweeping contour lines of the original vehicle.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A tool for establishing a precise raised reference line on a vehicle's body panel comprising:

a flexible linear rod having linear axis and a front side and a back side wherein said front side has a groove formed thereon parallel to said linear axis, and said back side has a smooth surface;

a locking support having a housing body and an adjustable locking plate slideably mounted thereon an outer surface thereof said housing body, said locking plate having a planar configuration with a front lip conformed for mating physical engagement with said groove.

2. The tool for establishing a precise raised reference line on a vehicle's body panel of claim 1 wherein said locking support has a front face with a perimeter, and a magnet affixed to said front face.

3. The tool for establishing a precise raised reference line on a vehicle's body panel of claim 2 wherein said locking support has at least one flexible, elastically deformable seal affixed on said perimeter of said front face.

4. The tool for establishing a precise raised reference line on a vehicle's body panel of claim 3 wherein said locking support has a lockable, adjustable positioning bar therein, said positioning bar having a series of grooves formed thereon that matingly engage a lip on said housing.

5. The tool for establishing a precise raised reference line on a vehicle's body panel of claim 4 wherein said locking support has a spring loaded block slidingly mounted about said positioning bar, said block rigidly affixed to said locking plate.

6. The tool for establishing a precise raised reference line on a vehicle's body panel of claim 1 wherein said flexible rod has a low friction surface thereon.

7. The tool for establishing a precise raised reference line on a vehicle's body panel of claim 1 wherein said flexible rod is made of pultruded glass covered in Teflon® polytetrafluoroethylene (PTFE).

\* \* \* \* \*